No. 644,047. Patented Feb. 27, 1900.
T. ALMQUIST.
RAIN WATER FILTER AND SETTLING TANK.
(Application filed Aug. 21, 1899.)
(No Model.)

Witnesses
Elgie H. Evans
Hascal R. Brill Jr.

Inventor
Theodore Almquist
By his Attorneys
Merwin Lothrop & Johnson

UNITED STATES PATENT OFFICE.

THEODORE ALMQUIST, OF COKATO, MINNESOTA.

RAIN-WATER FILTER AND SETTLING-TANK.

SPECIFICATION forming part of Letters Patent No. 644,047, dated February 27, 1900.

Application filed August 21, 1899. Serial No. 727,873. (No model.)

*To all whom it may concern:*

Be it known that I, THEODORE ALMQUIST, a citizen of the United States, residing at Cokato, in the county of Wright and State of Minnesota, have invented certain new and useful Improvements in Rain-Water Filters and Settling-Tanks, of which the following is a specification.

My invention relates to improvements in a combination rain-water filter and settling-tank, and has for its object to provide an apparatus for filtering rain-water in its passage from the roof or other place of collection to the cistern or storage-reservoir after first allowing the coarser impurities to settle and be deposited.

To this end my invention consists in the improved construction hereinafter specifically described, and pointed out in the claims.

Figure 1:
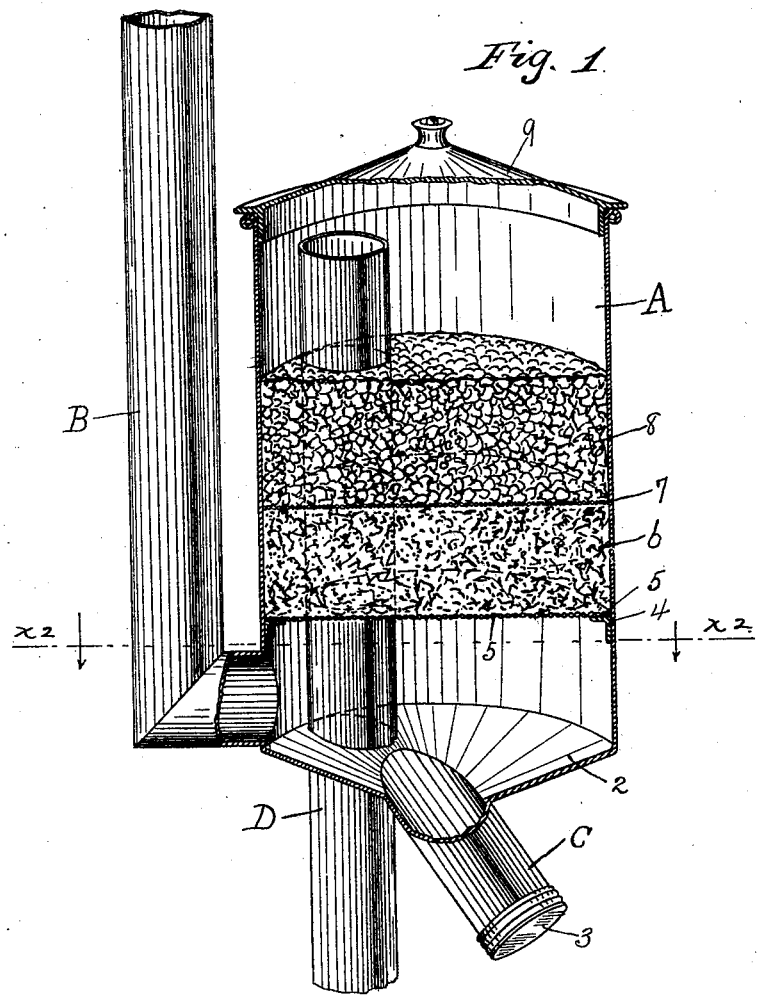
Figure 2:
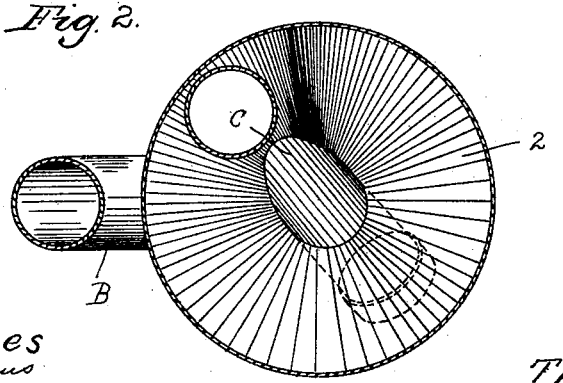

In the accompanying drawings, forming part of this specification, Figure 1 is a view, partly in elevation and partly in vertical section, of my improved filter and settling-tank; and Fig. 2 is a sectional view taken on line $x^2$ $x^2$ of Fig. 1 looking downward.

In the drawings, A represents the filtering-chamber, which may be made of tin plate or other suitable material and is preferably cylindrical in shape.

B is the inflow-pipe, leading from the roof or other place of collection of the rain-water to the chamber, which it enters at the side, near the bottom, below the filtering material, hereinafter described. The bottom 2 of the filtering-chamber slopes on all sides downwardly and inwardly toward its center, where it is formed with a downwardly and outwardly extending pipe or pocket C, provided with a removable cap 3 or other device, preferably detachable, for closing the same.

Within the chamber A, above the outlet end of the inflow-pipe B and supported by suitable brackets 4, is a screen or mat 5, upon which rests a layer of charcoal or other fine filtering material 6. Above this material and separated from it by a screen or mat 7 is a layer of gravel or other coarse filtering material 8. Leading from the space above the filtering material and passing, preferably, through the bottom of the chamber is an outflow-pipe D to conduct the filtered water to the cistern or other desired place of storage. The filtering-chamber is provided at the top with a suitable cover 9.

In use the rain-water passes down the inflow-pipe B into the space below the filtering material, where it acquires a rotary motion from the shape of the sides and bottom of the chamber. As the coarser impurities settle they are caused by the combined effect of the sloping bottom 2 and the swirling motion of the water to collect at the center, where they drop into the pocket or pipe C, from which they may be removed, when desired, by taking off the cap 3. As the rain-water continues to flow into the chamber A it rises through the filtering material and into the space above it until it reaches the level of the top of the outflow-pipe, when it will pass down and out through this pipe in purified condition. When desired, the supply of water through the filtering material and the outflow-pipe D may be cut off by removing the cap 3, thus allowing the water to pass directly from the lower part of the filtering-chamber through the pipe C to the outside.

Having now described my invention, what I claim as new, and desire to secure by Letters Patent, is—

1. An apparatus of the class described, consisting of a filter-chamber, provided with a bottom sloping downwardly and inwardly toward its center, a pocket or pipe extending down from the center of the bottom, an inflow-pipe opening into the lower part of the chamber at the side, filtering material arranged in said chamber above the outlet end of the inflow-pipe, and an outflow-pipe leading from the space above the filtering material to the outside of the chamber.

2. An apparatus of the class described, consisting of a filter-chamber provided with a bottom sloping downwardly and inwardly toward its center and terminating in a downwardly and outwardly extending pipe or pocket, an inlet-pipe opening into the lower part of the chamber at the side, filtering material arranged in said chamber above the outlet end of the inflow-pipe, and an outflow-pipe leading from the space above the filtering material to the outside of the chamber.

In testimony whereof I affix my signature in presence of two witnesses.

THEODORE ALMQUIST.

Witnesses:
C. R. PETERSON,
FRANK SWANSON.